United States Patent
Meyer

(10) Patent No.: US 6,171,014 B1
(45) Date of Patent: Jan. 9, 2001

(54) CLIP WITH SLIDING LID FOR AN AUTOMOTIVE SEAT AND SIMILAR APPLICATIONS

(75) Inventor: Charles Meyer, New Lenox, IL (US)

(73) Assignee: Illinois Tool Works, Inc., Glenview, IL (US)

(*) Notice: Under 35 U.S.C. 154(b), the term of this patent shall be extended for 0 days.

(21) Appl. No.: 09/184,992

(22) Filed: Nov. 3, 1998

(51) Int. Cl.[7] ............................................. F16L 3/08
(52) U.S. Cl. ........................ 403/397; 403/331; 248/49; 248/74.4; 24/616
(58) Field of Search ........................ 403/397, 388, 403/331, 326, 329, 398, 396; 248/49, 73, 71, 74.4; 24/616, 642, 563; 74/502.4, 502.6

(56) References Cited

U.S. PATENT DOCUMENTS

| | | |
|---|---|---|
| 3,286,963 | 11/1966 | Bergman . |
| 3,370,815 | 2/1968 | Opperthauser . |
| 4,185,802 | 1/1980 | Myles et al. . |
| 4,347,998 | 9/1982 | Loree . |
| 4,391,426 * | 7/1983 | Gothberg ............................... 248/49 |
| 4,729,531 | 3/1988 | Smith et al. . |
| 4,907,767 * | 3/1990 | Corsi et al. ............................. 248/49 |
| 4,979,704 | 12/1990 | Lowry et al. . |
| 5,217,587 | 6/1993 | Bridger et al. . |
| 5,272,934 | 12/1993 | Chegash et al. . |
| 5,535,969 * | 7/1996 | Duffy, Jr. ........................... 403/397 X |
| 5,588,683 | 12/1996 | Schliessner . |
| 5,601,262 | 2/1997 | Wright . |
| 5,803,414 * | 9/1998 | Wright ............................... 403/397 X |

* cited by examiner

Primary Examiner—Lynne H. Browne
Assistant Examiner—David E. Bochna
(74) Attorney, Agent, or Firm—Pitney, Hardin, Kipp & Szuch LLP

(57) ABSTRACT

The clip includes a body and a lid slidably mounted on tracks on the sides of the lid. A trough formed in the body receives a cylindrical item, such as a rod, pipe or conduit. The lid slides between an open or pre-driven position wherein the lid does not cover the trough, and a closed position wherein the lid covers the trough. The tracks are somewhat inclined with respect to the body so that the lid does not contact the rod in the trough until immediately prior to the closing of the lid. Sloped stop ramps on the body detent engage apertures in the lid in both the open position and the closed position. The underside of the body includes a second trough with a "rabbit ear" detent mechanism to engage a second cylindrical item, such as a rod, pipe or conduit.

13 Claims, 6 Drawing Sheets

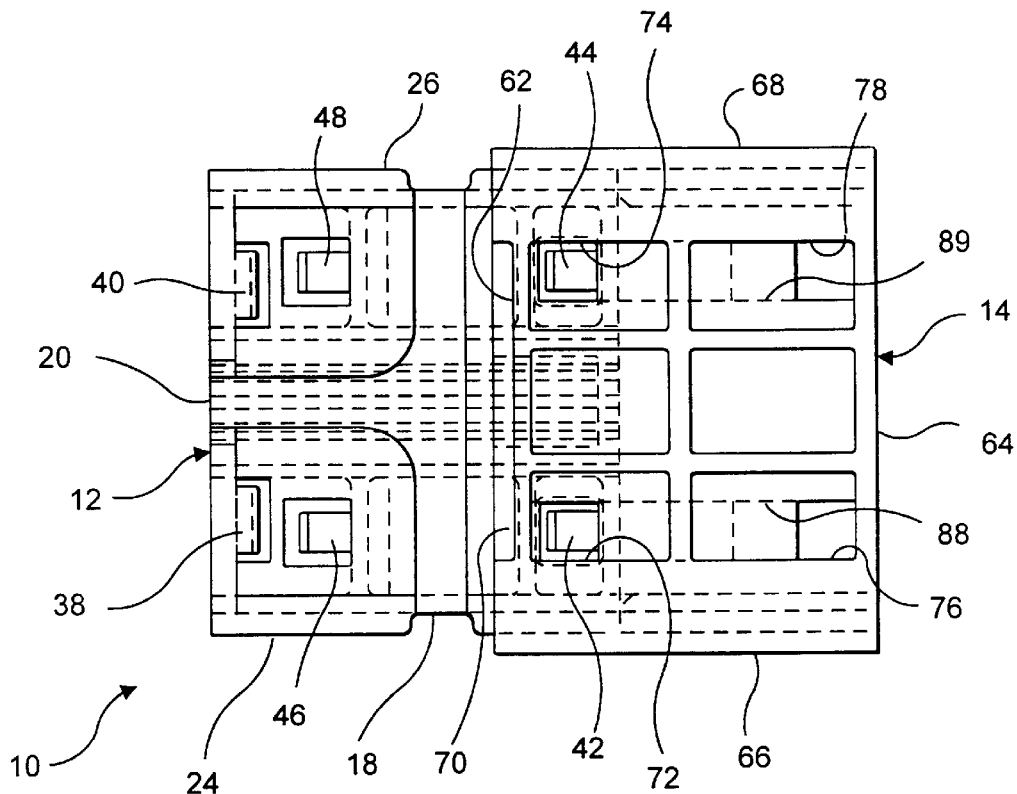
F I G. 4
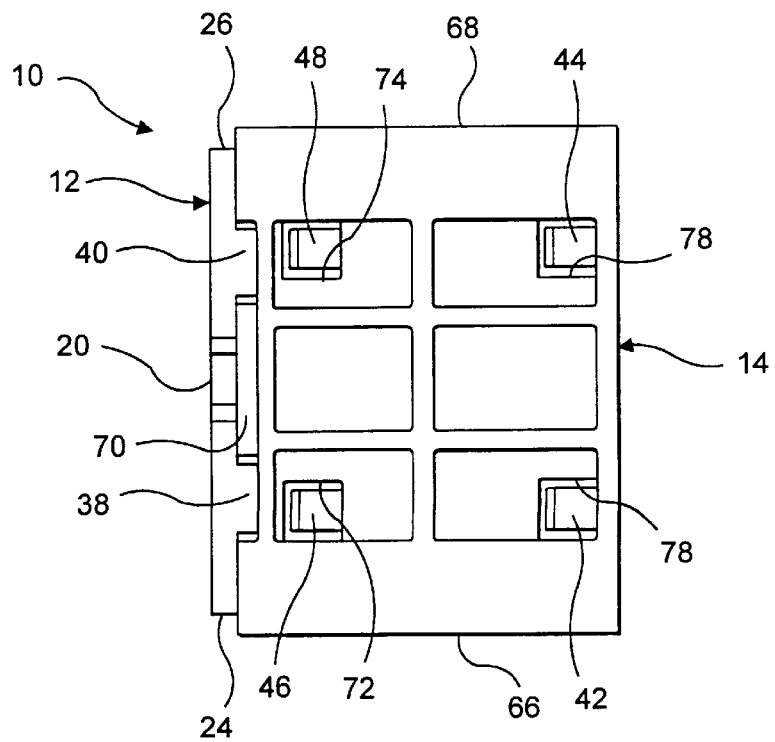
F I G. 5

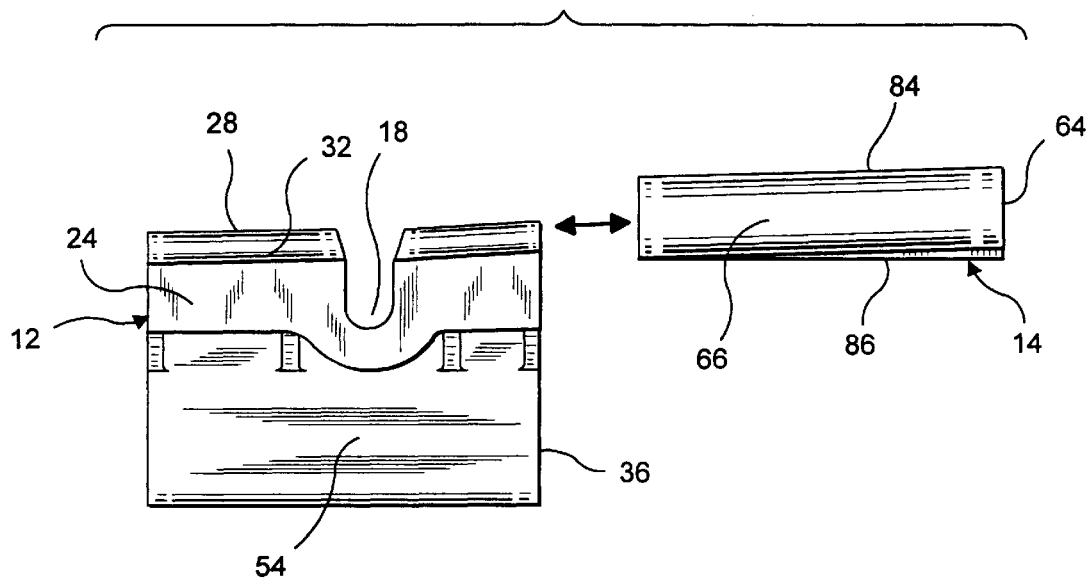
F I G. 6
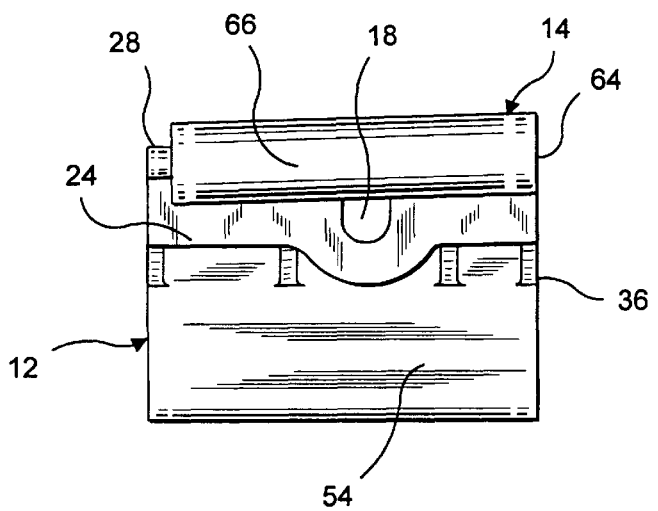
F I G. 7

CLIP WITH SLIDING LID FOR AN AUTOMOTIVE SEAT AND SIMILAR APPLICATIONS

BACKGROUND OF THE INVENTION

1. Field of the Invention

This invention pertains to a clip with a sliding pillbox-type lid which can be used for attaching rods, particularly for attaching rods within an automotive seat assembly, such as a lumbar support, or for holding a tubular component such as a brake line.

2. Description of the Prior Art

In the prior art, it is known to use clips for securing the rods in an automotive seat assembly, such as associated with a lumbar assembly. Typically, these prior art clips have included a "fold-over" design wherein two gripping portions have been attached by a living hinge or similar hinge, and a rod has been engaged between the two gripping portions which are then fastened to each other. These clips have been difficult to install.

Similar clips have been used for attaching pipes or conduits.

Additionally, some prior art clips have been metallic clips which are difficult to install and which may include sharp metallic edges which are dangerous to the installer. Moreover, the metallic clips have been expensive to manufacture.

OBJECTS AND SUMMARY OF THE INVENTION

It is therefore an object of this invention to provide a clip, particularly for automotive seat applications, which is simple to install.

It is therefore a further object of this invention to provide a clip, particularly for automotive seat applications, which is made from plastic.

It is therefore a still further object of this invention to provide a clip which has reduced costs of manufacture.

It is therefore a further object of this invention to provide a clip which can be adapted for securing pipes or conduits.

These and other objects are attained by providing a clip with a body and a pillbox-style sliding lid. The body and lid are initially molded as a single piece of plastic. The body includes a trough on its upper surface for engaging a first rod set and a rabbit ear type retention device on its lower surface for engaging a second rod set. The body further includes rails upon which the lid rides. The body includes a first set of ramped stop tabs to hold the lid in a pre-driven state with the trough exposed. The body includes a second set of ramped stop tabs to hold the lid in a fully closed position wherein the lid covers the trough thereby securing the rod which is engaged in the trough. The body further includes anti-bowing tabs which engage the leading edge of the lid in the fully closed position. The rails of the body upon which the lid rides are angled at approximately three degrees so that the lid does not contact the rod within the trough until the lid is nearly closed. This reduces the amount of force required to close the lid while maintaining a secure engagement to the first rod set.

BRIEF DESCRIPTION OF THE DRAWINGS

Further objects and advantages of the invention will become apparent from the following description and claims, and from the accompanying drawings, wherein:

FIG. 4 is a top plan view of the clip of the present invention in the open, pre-driven state.

FIG. 5 is a top plan view of the clip of the present invention in the closed state.

FIG. 6 is a side plan exploded view of the clip of the present invention.

FIG. 7 is a side plan view of the clip of the present invention in the closed state.

DETAILED DESCRIPTION OF THE PREFERRED EMBODIMENT

Figure 1:
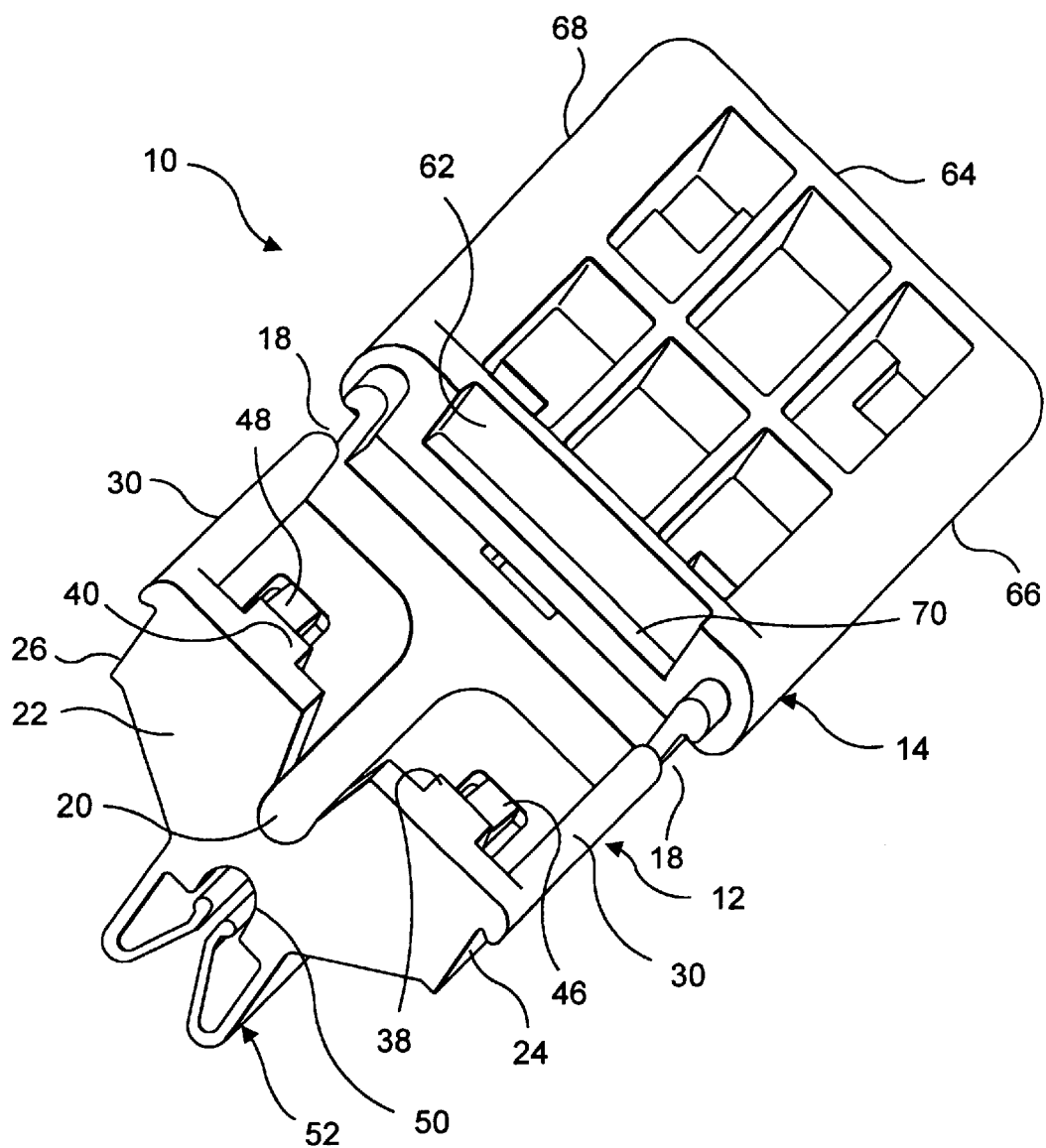
FIG. 1 is a top perspective view of the clip of the present invention in the open, pre-driven state.
Figure 2:
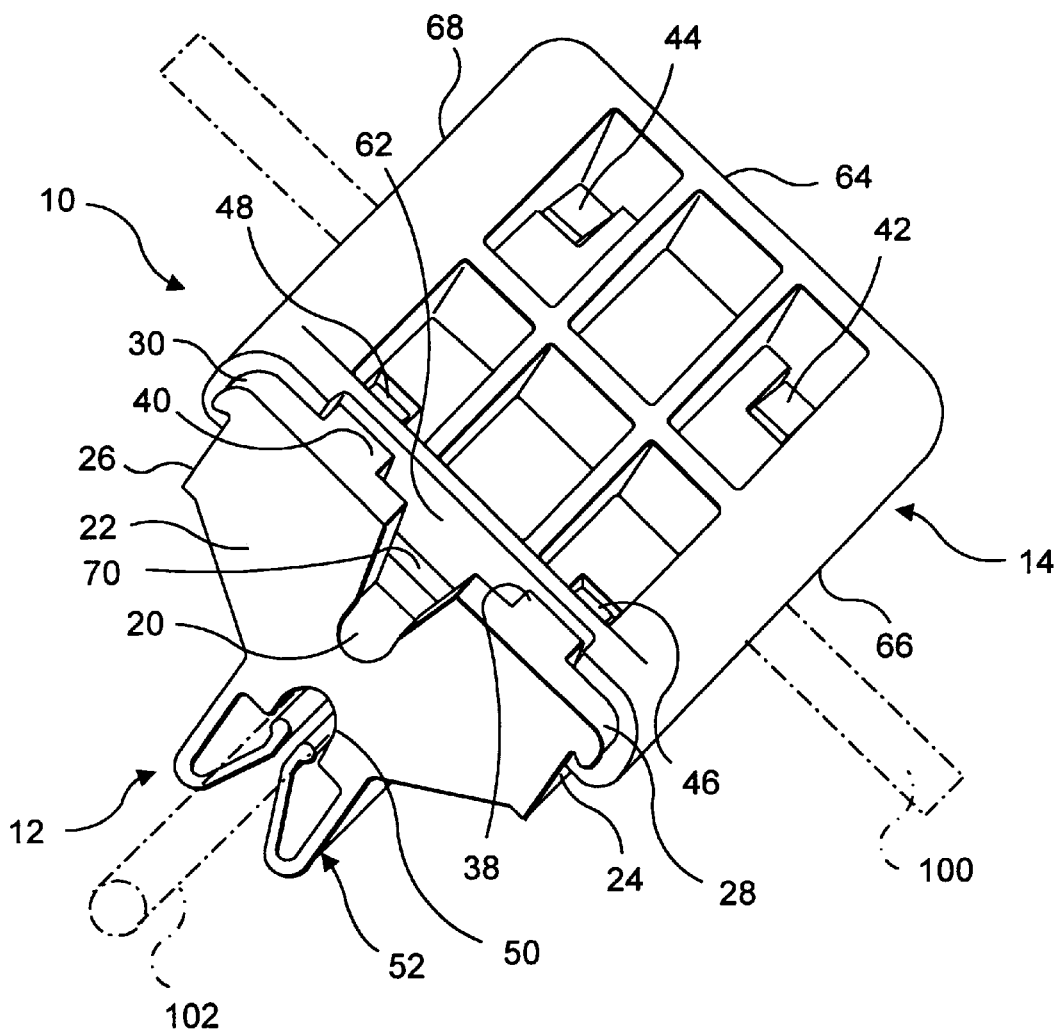
FIG. 2 is a top perspective view of the clip of the present invention in the closed state, with two rods sets illustrated in phantom.

Referring now to the drawings in detail wherein like numerals refer to like elements throughout the several views, one sees that FIG. 1 is a top perspective view of the clip 10 of the present invention in the open pre-driven state. Clip 10 includes body 12 and sliding lid 14. Body 12 and sliding lid 14 are typically plastic and can be molded as a single piece with subsequent disassembly into separate but engaging pieces. Body 12 includes relatively planar base 16 with transverse trough 18 formed therein. Longitudinal trough portion 20 extends from a central position of transverse trough 18 to front surface 22 of body 12. Therefore, a straight primary rod set 100, as illustrated in FIG. 2 in phantom, can be engaged in transverse trough 18. Alternatively, a primary rod set with a right angle (not shown) can pass through longitudinal trough portion 20 and a portion of transverse trough 18. Primary rod set 100 and secondary rod set 102 are typically rod sets in an automotive seat application, but may also be pipes or conduits in diverse applications, as would be known to those skilled in the art.

The lateral sides 24, 26 of body 12 include rails 28, 30 formed by outwardly extending flanges 32, 34 (see FIG. 8) on the upward surface thereof. As shown in FIG. 6, rails 28, 30 as formed on the upward surface of lateral sides 24, 26 slope at angle of approximately three degrees downward from the rear surface 36 of body 12 to the front surface 22 of body 12. This, along with a similar inclination of components of sliding lid 14 which will be explained hereinafter, allows the sliding lid 14 to reduce or eliminate contact with primary rod set 100 until sliding lid 14 is nearly in the closed position of FIGS. 2 and 5.

Front surface 22 of body 12 includes rearwardly extending tabs 38, 40 to engage sliding lid 14 in the closed position and minimize or eliminate subsequent bowing of sliding lid 14. First ramped stop tabs 42, 44, which ramp upwardly in the direction facing the front surface of body 12, are formed inwardly adjacent to rear surface 36 on generally planar base 16. First ramped stop tabs 42, 44 engage sliding lid 14 in the pre-driven state shown in FIGS. 1 and 4 to prevent sliding lid 14 from being urged rearwardly to separate from base 12. Second ramped stop tabs 46, 48, which likewise ramp upwardly in the direction facing the front surface 22 of body 12, are formed inwardly adjacent to front surface 22. Second ramped stop tabs 46, 48, along with first ramped stop tabs 42, 44, engage sliding lid 14 in the closed position illustrated in FIGS. 2, 5 and 7.

Secondary lower longitudinal trough 50 is formed on the bottom of body 12. A "rabbit ear" rod retention device 52 is formed from outer vertical walls 54, 56 which join inner sloping walls 58, 60 in a detent configuration wherein a secondary rod set 102 (shown in FIG. 2 in phantom) can be snap detent inserted into secondary lower longitudinal trough 50.

Figure 3:
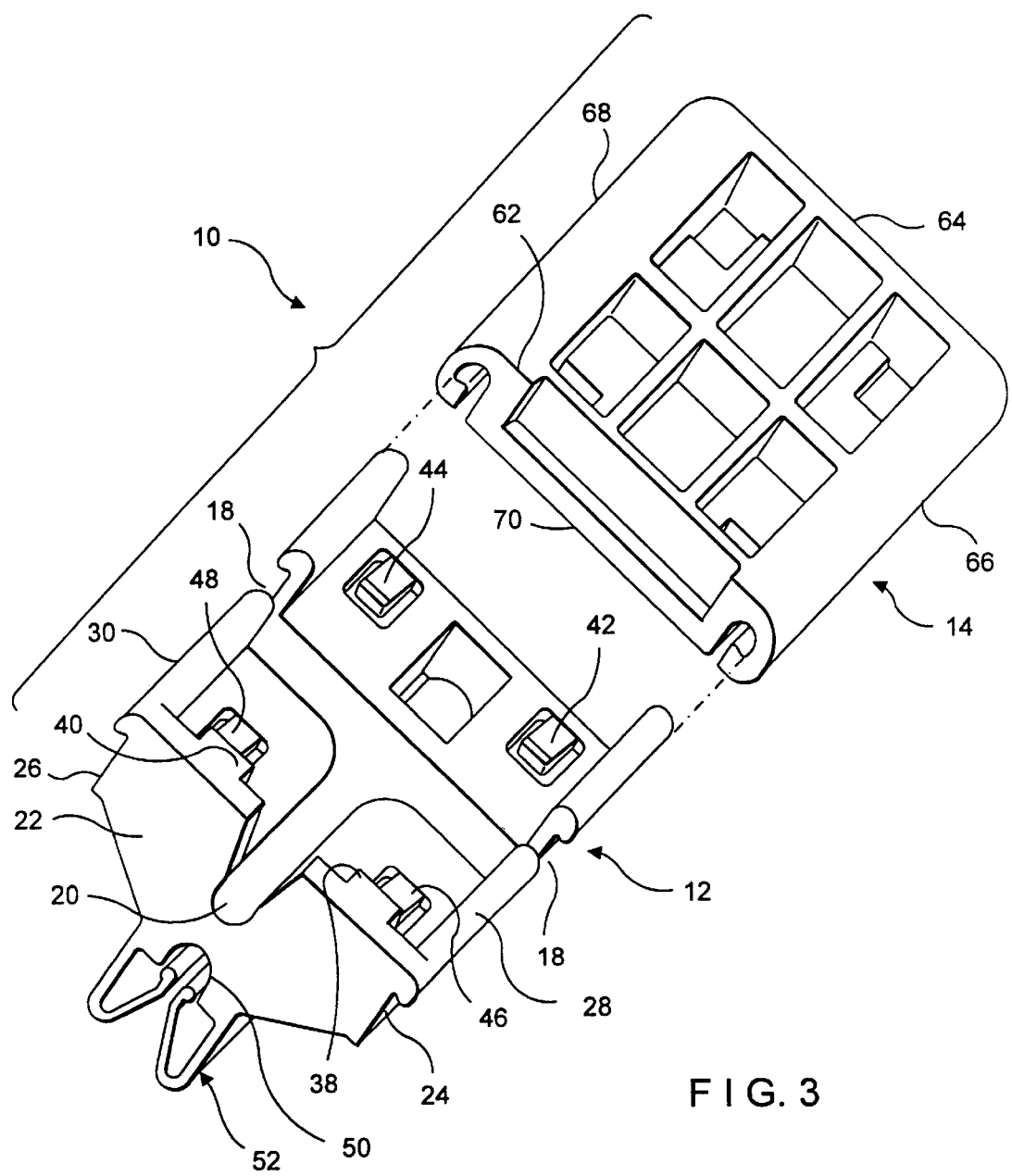
FIG. 3 is a top perspective exploded view of the clip of the present invention.

Sliding lid 14, as shown in FIG. 3, is generally rectangular and is formed from front surface 62, rear surface 64 and lateral surfaces 66, 68. Front surface 62 includes horizontal ledge 70 for engaging rearwardly extending tabs 38, 40 of front surface 22 of body 12 in the closed position (see FIG. 5) thereby minimizing or eliminating subsequent bowing of sliding lid 14. Forward locking apertures 72, 74 are formed inwardly adjacent from front surface 62 and are engaged by first ramped stop tabs 42, 44 of body 12 in the pre-driven state of FIGS. 1 and 4 thereby inhibiting sliding lid 14 from being withdrawn from body 12. Forward locking apertures 72, 74 of sliding lid 14 likewise are engaged by second ramped stop tabs 46, 48 in the closed state of FIGS. 2 and 5. Rearward locking apertures 76, 78 are formed inwardly adjacent from rear surface 64 and are engaged by first ramped stop tabs 42, 44 of body 12 in the closed position of FIGS. 2 and 5.

Figure 8:
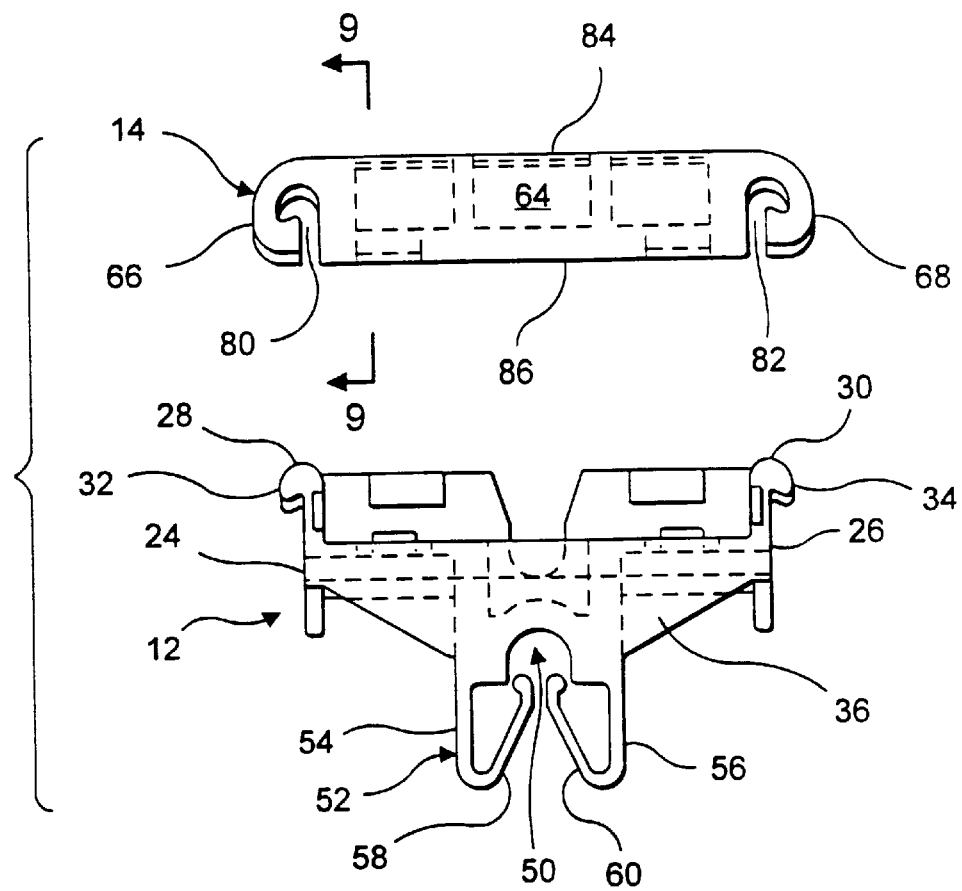
FIG. 8 is a rear plan view of the clip of the present invention, with the lid shown in an exploded position above the body.
Figure 9:
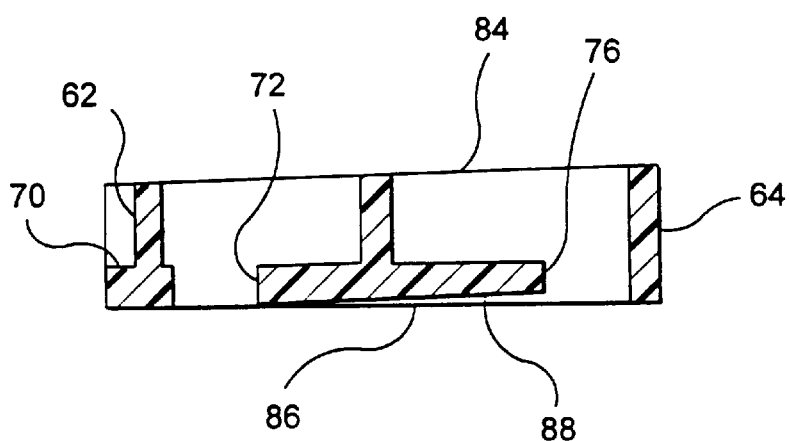
FIG. 9 is a cross-sectional view along plane 9—9 of FIG. 8.

As shown in FIG. 8, lateral surfaces 66, 68 of sliding lid 14 include grooves 80, 82, respectively, which are complementary to rails 28, 30 of body 12. When rails 28, 30 engage grooves 80, 82, sliding lid 14 rides on rails 28, 30. Additionally, as shown in FIG. 6, the side profile of lid 14 (as shown as the distance between upper surface 84 and lower surface 86) has a declination in the forward direction similar to that of rails 28, 30 (that is, approximately 3 degrees). The top surface of grooves 80, 82 is substantially parallel to upper surface 84 of sliding lid 14. Similarly, as shown in FIG. 9, lower inclined guide groove 88 is formed on lower surface 86 between forward locking aperture 72 and rearward locking aperture 76 (as shown in phantom in FIG. 4, a similar groove 89 is formed between forward locking aperture 74 and rearward locking aperture 78). Lower inclined guide groove 88 is substantially parallel to upper surface 84 so that lower inclined guide groove 88 has no discernible depth at forward locking aperture 72 but has increasing depth as lower inclined guide groove 88 approaches rearward locking aperture 76 in view of the relative inclination between upper surface 84 and lower surface 86. Grooves 88, 89 are reliefs for first ramped stop tabs 42, 44 as first ramped stop tabs 42, 44 are taller than second ramped stop tabs 46, 48. First ramped stop tabs 42, 44 are taller than second ramped stop tabs 46, 48 because the gap between planar base 16 of body 12 and lid 14 is greater in the open or pre-driven state (see FIG. 1) than in the closed state (FIG. 2). As lid 14 is moved from the open or pre-driven state to the closed state, this gap is reduced. The relief provided by grooves 88, 89 prevents over-deflection and possible breakage of first ramped stop tabs 42, 44. This configuration allows sliding lid 14 to have minimal or reduced contact with first ramped stop tabs 42, 44 until sliding lid 14 is in the fully closed or locked position.

Clip 10 is typically provided in the pre-driven configuration illustrated in FIGS. 1 and 4. The user typically inserts primary rod set 100 into transverse trough 18 (or longitudinal trough portion 20 and some portion of transverse trough 18) and slides sliding lid 14 from the pre-driven configuration to the closed configuration. The user then typically snap detent engages secondary rod set 102 into secondary lower longitudinal trough 50.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A clip for engaging a rod comprising:
   a body including a generally planar surface, a front face, a rear face, two lateral faces, a first trough in said generally planar surface for receiving the rod, track means proximate to said lateral faces, and a first detent element;
   a lid slidably mounted on said track means and slidably moveable between an open position wherein said lid is free from covering said trough and a closed position wherein said lid is substantially co-extensive with said generally planar surface and covers said trough, thereby engaging the rod in said trough, said lid including grooves for engaging said track means;
   said lid further including a second detent element for engaging said first detent element in said closed position, and,
   means for detent engaging a second rod.

2. The clip of claim 1 wherein said means for detent engaging a second rod is on said body.

3. The clip of claim 2 wherein said means for detent engaging a second rod includes a second trough on a lower surface of said body.

4. The clip of claim 3 wherein said first trough is transversely oriented with respect to a direction of travel of said lid.

5. The clip of claim 4 wherein said first trough extends between said two lateral faces, and further including a trough portion which extends perpendicularly from a central portion of said first trough to said front face.

6. The clip of claim 5 wherein said body includes a third detent element for engaging said second detent element in said open position.

7. The clip of claim 6 wherein said first detent element and said third detent element each include at least one ramped stop element extending from said generally planar surface, and wherein said second detent element includes at least one aperture in said lid.

8. The clip of claim 7 further including a fourth detent element in said lid comprising at least one aperture for being engaged by said third detent element in said closed position.

9. The clip of claim 8 wherein said body further includes tabs extending rearwardly from said front face and wherein said lid further includes a ledge engaged by said tabs in said closed position thereby inhibiting said lid from bowing away from said body in said closed position.

10. The clip of claim 9 wherein said track means incline downwardly in a direction from said rear face to said front face of said body.

11. The clip of claim 10 wherein an upper surface of said lid is parallel to said track means and a lower surface of said lid is parallel to said generally planar surface.

12. The clip of claim 11 wherein said body and said lid are comprised of molded plastic.

13. The clip of claim 12 wherein said body and said lid are initially molded as a single piece.

* * * * *